United States Patent
Loscalzo

[15] 3,668,736
[45] June 13, 1972

[54] GROOMING AND CLEANING DEVICE

[72] Inventor: Nicholas R. Loscalzo, Melville, N.Y.
[73] Assignee: Petcraft Industries Incorporated, Melville, N.Y.
[22] Filed: April 13, 1970
[21] Appl. No.: 27,721

[52] U.S. Cl. ................... 15/402, 15/347, 15/362, 15/365, 15/374, 15/375, 55/490, 55/521, 55/529
[51] Int. Cl. ........................................ A47l 9/06
[58] Field of Search ............. 15/314, 344, 347, 350–351, 15/367, 374, 402, 421; 119/83, 86–87, 89, 92–93

[56] References Cited

UNITED STATES PATENTS

| | | | |
|---|---|---|---|
| 3,383,839 | 5/1968 | Hintermaier | 15/340 X |
| 3,213,480 | 10/1965 | Miller | 15/314 |
| 1,894,905 | 1/1933 | Fechtenburg | 15/402 |
| 1,859,132 | 5/1932 | Fechtenburg | 15/402 |
| 3,543,325 | 12/1970 | Hamrick | 15/314 |
| 3,440,681 | 4/1969 | Hixson et al. | 15/339 |

Primary Examiner—Walter A. Scheel
Assistant Examiner—C. K. Moore
Attorney—Stoll and Stoll

[57] ABSTRACT

For grooming the coat of an animal, a device having a working appliance and a collecting appliance connected to a vacuum source, and a flexible hose joining the appliances. The working appliance comprises a tubular handle section connected to a hose, a nozzle end defining a substantially planar opening, a plurality of slotted ribs behind the opening to receive a removable currycomb and a removable depth-stop comprising a rigid member extending below the plane of the nozzle opening. The collecting appliance is a filter which includes a container enclosing a removable filter basket. The container has a base with a tubular vacuum port for connection to the vacuum source; the lid is similarly provided with a tubular opening but for connection to the flexible hose and the base and the filter basket are cooperatively flanged to support the filter basket.

3 Claims, 10 Drawing Figures

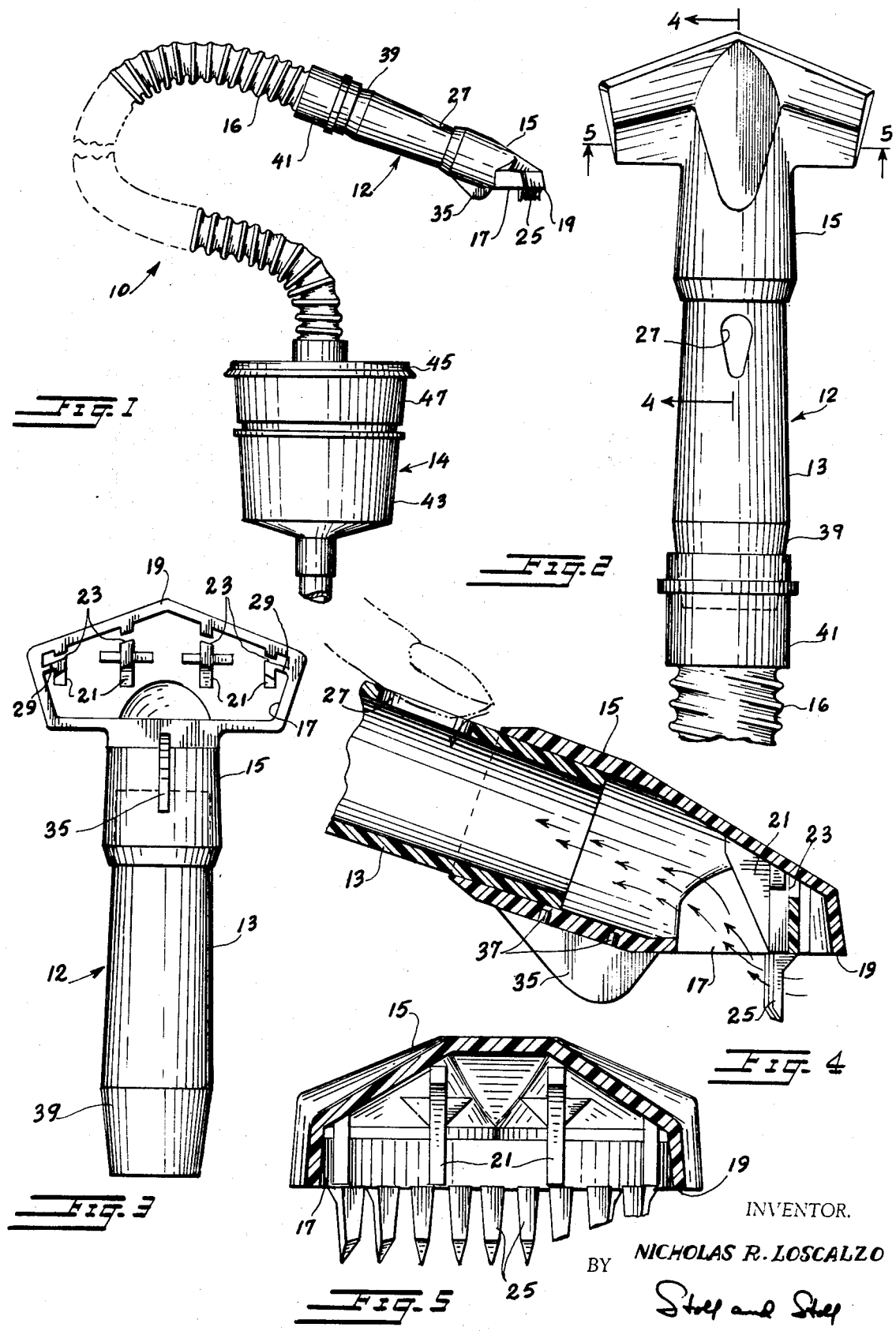

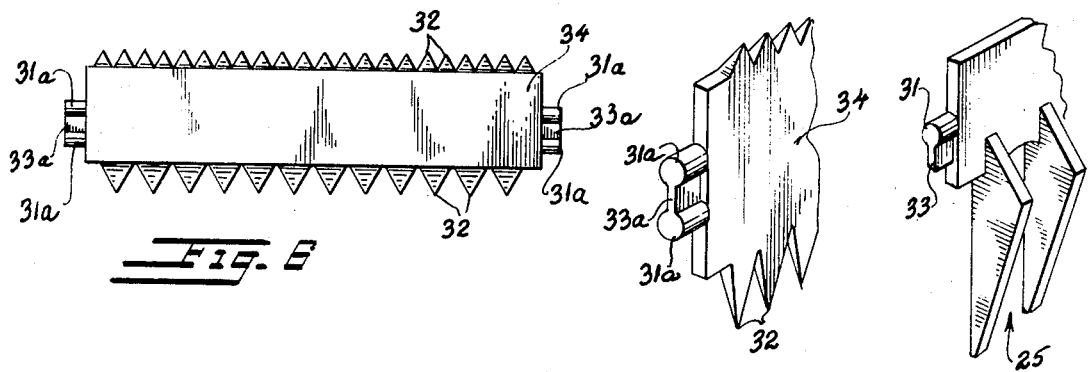
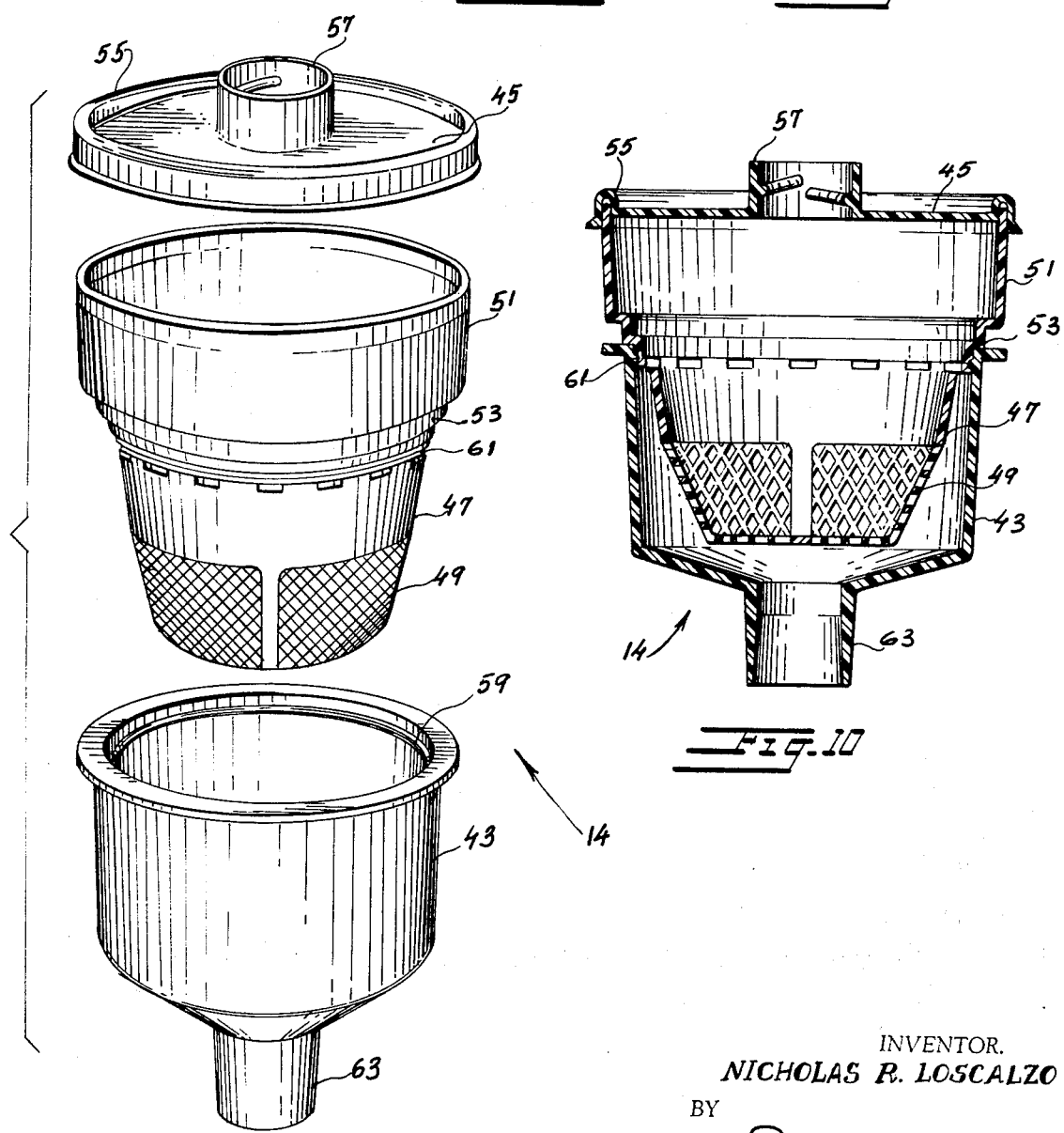

GROOMING AND CLEANING DEVICE

REFERENCE TO RELATED APPLICATION

This application is related to co-pending patent application Ser. No. 857,894 now abandoned filed Sept. 15, 1969.

BACKGROUND OF THE INVENTION

1. Field of the Invention

Animal grooming devices, particularly cleaners and combs for pet coats.

2. Description of the Prior Art

The prior art is evidenced by the following United States Patents:

| Patent No. | | Date |
|---|---|---|
| 997 | Sanford | November 3, 1838 |
| 1,011,989 | Mohr | December 19, 1911 |
| 1,018,136 | Slevin | February 20, 1912 |
| 1,044,275 | Slevin | November 12, 1912 |
| 1,770,749 | Engberg et al. | July 15, 1930 |
| 1,878,345 | | |
| 2,616,120 | Erling | November 4, 1952 |
| 2,780,829 | Cohen | February 12, 1957 |
| 2,953,808 | Carmack | September 27, 1960 |
| 3,145,691 | Yates | August 25, 1964 |
| 3,209,386 | Weber | October 5, 1965 |
| 3,308,500 | Woodruff | March 14, 1967 |
| 3,343,199 | Nolte | September 26, 1967 |
| 3,440,681 | | |

None of the foregoing provides the appliances or combination of appliances of the animal grooming device disclosed herein.

SUMMARY OF THE INVENTION

Basically, and not by way of limitation, the present invention comprises a working appliance including a handle, nozzle and replaceable currycomb, a collecting appliance including a container and tubing connecting the appliances and a port intended for attachment to a standard household vacuum cleaner. The working appliance is provided with a substantially planar nozzle opening communicating through the filter with the vacuum source, a plurality of grooved ribs adapted to receive a flexible currycomb, a depth-limiting stop removably applied to the handle extending a desired distance below the plane of the opening, a tapered hole in the handle wall for manual adjustment of the nozzle vacuum and a tapered tubular collar portion for connection to a conduit. The conduit is a standard vacuum cleaner hose. The hose extends to an opening provided in the lid of the filter basket enclosure. The base of the enclosure is provided with a small tubular port for connection to a standard household vacuum cleaner. Within the container is a removable filter basket incorporating circumferential flanges adapted to rest on cooperating flanges of the container base. The filter basket is provided with an extended sidewall for connection between the base of the enclosure and the lid.

BRIEF DESCRIPTION OF THE DRAWING

FIG. 1 is a view of the animal grooming device of the present invention showing the working appliance, the collecting appliance and the hose connecting therebetween.

FIG. 2 is a top view of the working appliance of the present invention.

FIG. 3 is a bottom view of the working appliance of the present invention.

FIG. 4 is an enlarged cross-sectional view taken across line 4—4 of FIG. 2.

FIG. 5 is an enlarged cross-sectional view taken across line 5—5 of FIG. 2.

FIG. 6 is a plan view of a replaceable currycomb of the present invention.

FIG. 7 is an enlarged perspective view of the end fastener pin of the currycomb shown in FIG. 6.

FIG. 8 is a view similar to that of FIG. 7 but showing a different currycomb.

FIG. 9 is an exploded perspective view of the collecting appliance of the present invention showing the lid, filter basket and base portions thereof.

FIG. 10 is a cross-sectional view taken through the collecting appliance of the present invention and showing the respective parts thereof assembled.

DESCRIPTION OF PREFERRED EMBODIMENTS OF THE INVENTION

Referring to the drawing, the animal grooming device 10 of the present invention includes a working appliance 12, a collecting appliance 14 and a hose 16 connecting and communicating between the working and collecting appliances.

Working appliance 12 comprises a tubular handle 13 and a head 15 having a nozzle opening 17 defined therein. Nozzle opening 17 is defined by the rim 19 of head 15 to be substantially planar. Opening 17 communicates through head 15 and tubular handle 13 to hose 16.

Within rim 19 and behind planar opening 17 are a plurality of grooved ribs 21. While the ribs themselves are joined to head 15 preferably in parallel alignment, the grooves 23 are preferably aligned so as to describe an arc running across head 15 from side to side and substantially parallel to planar opening 17. Ribs 21 are adapted to receive and to support a currycomb 25 placed in grooves 23. The currycomb is substantially flexible to permit manual bending to a curvature conforming to that of the arc of grooves 23. The concave side of the arc is toward tubular handle 13.

The outermost of ribs 21 are each provided with a flange 29 extending laterally of the rib to rim 19. Each flange 29 is adjacent the arc described by grooves 23 and is adapted to receive a pin 31 extending from the end of currycomb 25. Pin 31, which may have an aligning web 33 formed integrally with the pin and the end of the currycomb, is adapted to bear against flange 29 so as to snap-in to position and secure currycomb 25 in head 15. The currycomb will not loosen and fall out under ordinary conditions but is nevertheless easily removable and replaceable.

A depth-stop 35 is removably mounted on the inside of head 15 and comprises a smoothly curved block which extends beneath the plane of planar nozzle opening 17 an amount dependent upon the depth to which currycomb 25 is intended to enter the coat of the animal. Depth-stop 35 may extend below that plane the same or a greater or a lesser amount as does currycomb 25. The teeth of the currycomb extending substantially perpendicular to that plane and to the coat of the animal, the danger of injuring the animal's skin is greatly minimized by depth-stop 35. To accommodate different currycombs and the differing requirements of various animal coats, depth-stop 35 is made removable and replaceable by means, for example, of a plurality of pins 37 which enter holes provided for the purpose in the inside of head 15.

The wall of tubular handle 13 is provided with a tapered hole 27 adapted to be engaged and covered at least in part by the thumb of the user. The function of tapered hole 27 is to vary the suction at nozzle opening 17 as will be described below.

Tubular handle 15 has a tapered end 39 opposite head 15 which secure into an end fitting 41 on hose 16. The handle taper provides a snug and secure fit into the end fitting yet permits the handle to be removed from the hose as desired in a manner normal to household vacuum cleaner hose fittings.

Collecting appliance 14 comprises a base 43, a lid 45 and a filter basket 47 intermediate the base and the lid. Filter basket 47 is provided with a mesh filter bottom 49, a substantially cylindrical sidewall 51 and a stepped flange 53 intermediate the mesh filter and the sidewall. Lid 45 extends across sidewall 51 and snugly engages the sidewall at a circumferential groove 55 to form a tongue- and-groove closure. The center of lid 45 has a flanged hole 57 adapted to receive the end of hose 16 opposite handle 13. Base 43 is substantially cylindrical to receive filter basket 47. The top of base 43 has a flange 59 adapted to receive and seat filter basket flange 53. An O-ring washer 61 may be positioned to seal between the cooperating flanges 53 and 59. The bottom of base 43 tapers inwardly to a tubular port 63 which is adapted for connection to a household vacuum cleaner.

OPERATION OF PREFERRED EMBODIMENTS OF THE INVENTION

With tubular port 63 connected to a vacuum source such as a common vacuum cleaner, working appliance 12 may be worked through the coat of an animal. Loose dust, dirt and hair is drawn through nozzle opening 17, handle 13 and hose 16 into filter basket 47 where it is collected for later discard. The construction of collecting appliance 14 is such that it is easily opened and the filter basket 47 easily removed for cleaning.

The suction at nozzle opening 17 may be adjusted within limits by manually exposing or covering hole 27 in handle 13. With hole 27 exposed, the suction is divided between it and nozzle opening 17. With hole 27 covered, the full vacuum is felt at nozzle opening 17. Varying the amount of coverage of hole 27 will vary accordingly the vacuum at nozzle opening 17. The tapered shape of hole 27 assists in this variation.

While the foregoing is illustrative of preferred embodiments of the invention, it is clear that other embodiments and modifications may be had within the teachings hereof. For example, it is a desirable attribute of the present invention that a reversible currycomb may be utilized. Such a currycomb is shown in FIGS. 6 and 7. Teeth 32 extend on opposite edges of the back 34 of the currycomb. Each end of the currycomb is provided with two pins 31a joined by an intermediate web 33a. Such a reversible currycomb may be inserted into head 15 with whichever row of teeth 32 extending downwardly as may be desired.

What is claimed is:

1. An animal vacuum cleaning device, comprising:
    a. a working appliance, said working appliance comprising a handle, a head, a nozzle opening defined in said head and a currycomb;
    b. the head of said working appliance being provided with a rim defining a substantially planar nozzle opening and being further provided with a plurality of grooved ribs in said head exposed through said opening and adapted to receive a currycomb, wherein
    c. said ribs are substantially parallel and said grooves form a curve substantially parallel to the plane of said nozzle opening and concave toward said handle, said grooves being adapted to receive a currycomb curved to substantially conform to said curve.

2. An animal vacuum cleaning device in accordance with claim 1 wherein:
    a. the outermost of said ribs are each provided with a flange extending to the rim of said head; and
    b. each end of said currycomb is provided with a pin extension and a reinforcing web adapted to engage against one of said flanges to prevent movement of the currycomb relative to the head during use.

3. An animal vacuum cleaning device in accordance with claim 2, wherein:
    said handle is provided with a tapered suction-adjusting hole defined therein.

* * * * *